United States Patent [19]

Schatteman

[11] Patent Number: 4,570,194
[45] Date of Patent: Feb. 11, 1986

[54] DISC PLAYER HAVING SELF-ACTUATED MAGNETIC CLAMPING DEVICE

[75] Inventor: Etienne A. Schatteman, Wemmel, Belgium

[73] Assignee: Staar S.A., Brussels, Belgium

[21] Appl. No.: 457,360

[22] Filed: Jan. 12, 1983

[30] Foreign Application Priority Data

Feb. 9, 1982 [BE] Belgium ............................. 892073

[51] Int. Cl.[4] ..................... G11B 17/04; G11B 25/04
[52] U.S. Cl. ..................................... 360/97; 360/133; 369/270
[58] Field of Search ............ 360/133, 135, 86, 97–99; 346/137; 369/270–271

[56] References Cited

U.S. PATENT DOCUMENTS

| | | | |
|---|---|---|---|
| 3,706,085 | 12/1972 | Mowrey et al. | 360/97 |
| 4,218,065 | 8/1980 | Van der Hoek et al. | 369/271 |
| 4,272,794 | 7/1981 | Skarky | 360/133 |
| 4,285,553 | 8/1981 | Robinson | 308/10 |
| 4,409,630 | 10/1983 | Saito | 360/99 |
| 4,477,894 | 10/1984 | Clurman | 360/133 |

FOREIGN PATENT DOCUMENTS 0070557 1/1983 European Pat. Off. .

Primary Examiner—Stuart N. Hecker
Assistant Examiner—David J. Severin
Attorney, Agent, or Firm—Leydig, Voit & Mayer Ltd.

[57] ABSTRACT

A magnetic clamping device for a disc player inherently moves to and is levitated in a resting position when the player housing and spindle are oriented for disc insertion, and moves to and is sustained in a clamping position when the player and housing are oriented for disc playing. The magnetic clamping device changes its position during a time when the centering hub of a spindle engages with the central aperture of the disc, so that the clamping device is always in its resting position when a disc is inserted or ejected, thereby eliminating scratching of the critical surfaces of the disc by the adjacent surface or edge of the magnetic clamping device. Preferably the magnetic clamping device has an annular permanent magnet with multiple pairs of poles disposed about the circumference of the annulus. A flux shorting washer of magnetically permeable material is secured to the top of the annulus so that the magnetic flux from the permanent magnet is emitted from the bottom of the annulus. The clamping device is levitated above the spindle and inserted disc by a levitating ring of permeable material affixed flush with the lower surface of the upper part of the disc player housing. Depending on the distance of the levitated clamping device from a disc driving plate of permeable material included in the spindle, the magnetic flux emitted from the bottom of the clamping magnet is preferably linked to the levitating ring for levitation or the disc driving plate for disc clamping. Thus the magnetic clamping device quickly switches between its resting position and its clamping position at the proper time in the disc insertion or ejection cycle.

14 Claims, 10 Drawing Figures

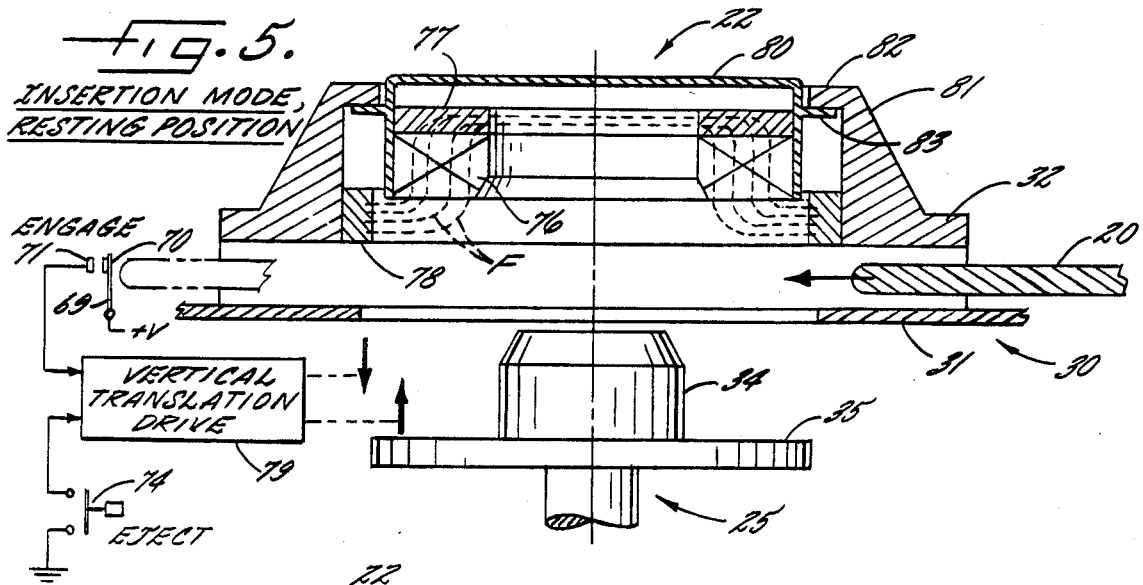
Fig. 5. INSERTION MODE, RESTING POSITION
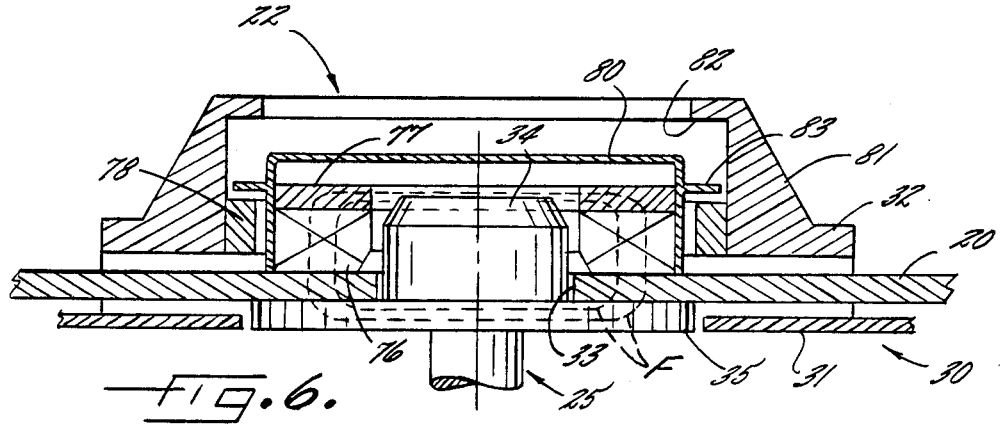
Fig. 6. PLAYING MODE, CLAMPING POSITION
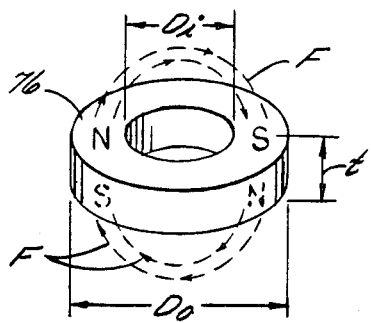
Fig. 7.
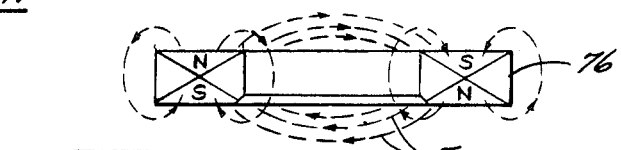
Fig. 8.
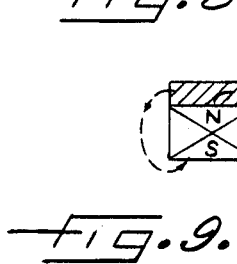
Fig. 9.
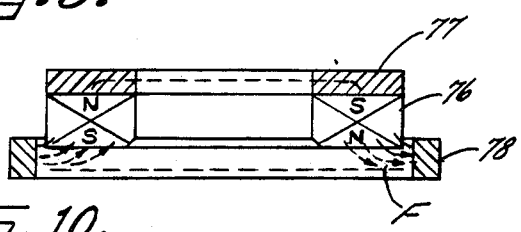
Fig. 10.

4,570,194

DISC PLAYER HAVING SELF-ACTUATED MAGNETIC CLAMPING DEVICE

TECHNICAL FIELD

This invention relates generally to the field of disc drives for the reproduction of information stored on discs. In particular, this invention relates to an automatic mechanism for clamping a disc to the drive spindle in a disc drive.

BACKGROUND ART

Disc drives for magnetic discs are well known in the field of data storage for electronic computers. The conventional phonograph record is another example of information stored in the disc format. Recently numerous high density technologies have permitted the storage of audio or video information on discs. An optical disc system, in which a laser beam reads information from the disc, is one preferred method since there is no wear or tear on the disc surface. But in such audio and video disc systems, special care is required in the handling of the disc to avoid scratches or other damage to the surfaces of the disc. Due to the high information density, surface damage may interfere with the reading out of the information.

At present automatic disc players are being developed of the kind which have a slit into which the disc is inserted so as to be received by an automatic positioning mechanism. The positioning mechanism is required in order to engage the disc with a drive spindle to rotate the disc. The disc must also be centered on the drive spindle which typically requires the engagement of a centering hub with a central hole in the disc. Thus means are required for effecting the relative axial movement of the centering hub with respect to the disc and further means are required for clamping the disc to the drive spindle when the central hole of the disc is engaged with the centering hub. Clamping the disc to the drive spindle presents a particularly difficult problem since the clamping mechanism must not interfere with the insertion of the disc into the disc player. Moreover, the disc is typically rotated at high speed on the order of 200 to 1800 revolutions per minute, and it is especially important that the clamping mechanism reliably holds the spinning disc against the drive spindle.

It is preferable to have the drive spindle with its axis vertical and to have the disc located above the spindle so that the central portion of the disc sits on the drive spindle and so that the drive spindle solidly rests on its bearings. But then the clamping mechanism must be raised off of the disc in order for the disc to be disengaged from the drive spindle. This raising of the clamping mechanism presents a difficulty because the mechanism's own weight must be countered and further the clamping mechanism must freely rotate with respect to whatever means are used to lift off the clamping mechanism. This is a consequence of the fact that the clamping mechanism must rotate with the disc when the disc is clamped to the spindle, yet when the clamping mechanism is lifted off the disc and spindle, the clamping mechanism must be kept clear of the disc so as not to scratch the upper surface of the disc when the disc is inserted or ejected from the disc drive.

DISCLOSURE OF INVENTION

The principal object of the invention is to provide a disc clamping device for a disc player which does not require any moving parts or electronic controls to prevent the clamping device from interfering with the insertion and ejection of the disc from the disc player.

Another object of the invention is to provide a disc drive clamping device which increased reliability and reduced maintenance requirements.

Yet another object of the invention is to provide a disc drive clamping device having failsafe operation so that the critical surfaces of the discs are not scratched or otherwise damaged.

Moreover, an object of the invention is to provide a disc drive clamping device which is inherently simple and economical to manufacture.

According to the invention in its broadest aspects, a magnetic clamping device for a disc player inherently moves to and is sustained in a resting position when the player housing and spindle are oriented for disc insertion, and in a clamping position when the player and housing are oriented for disc playing. The magnetic clamping device changes its position during a time when the centering hub of the spindle engages with the central aperture of the disc, so that the clamping device is always in its resting position when the disc is inserted or ejected, thereby eliminating scratching of the upper surface of the disc by the adjacent surface or edge of the magnetic clamping device. The magnetic clamping device contains ferromagnetic material, either magnetized or highly permeable, so that the clamping device begins to switch between the resting and clamping positions when the net magnetic force on the clamping device just balances the gravitational force, as the relative movement of the spindle with respect to the clamping device decreases or changes the direction of the net magnetic force on the clamping device. No control electronics or mechanical parts are needed for the specific purpose of operating the clamping device. Its operation is govered primarily by the geometric arrangement of magnetized and magnetically permeable material in the clamping device, disc player housing, and spindle.

A preferred geometry for the magnetic clamping device has an annular clamping magnet with multiple pairs of poles disposed about the circumference of the annulus so that magnetic flux from the top of the annulus, oriented horizontally, may be shorted out with a flux shorting washer of magnetically permeable material. The clamping device is levitated above the spindle and inserted disc by a levitating ring of permeable material affixed flush with the lower surface of the upper part of the disc player housing. Depending on the distance of the levitated clamping device from a disc driving plate of magnetically permeable material included in the spindle, the magnetic flux from the bottom of the clamping magnet is preferably linked to the levitating ring for levitation or the disc driving plate for disc clamping. Optimum operation of the preferred embodiment requires adherence to a particular geometry, as disclosed in detail below.

BRIEF DESCRIPTION OF THE DRAWINGS

Other objects and advantages of the invention will become apparent upon inspection of the drawings, wherein;

FIG. 5 is a detailed elevation view in partial cross-section of a preferred embodiment of the magnetic clamping device according to the invention shown in its resting or levitated position during insertion of the disc;

FIG. 6 is a detailed elevation view, in partial cross-section, of the preferred embodiment of the magnetic clamping device according to the invention, shown in its clamping position during playing of the disc;

FIG. 7 is a perspective view of the permanent magnet used in the magnetic clamping device shown in FIGS. 5-6 and showing magnetic lines of flux;

FIG. 8 is a cross-sectional view of the magnet shown in FIG. 7;

FIG. 9 is a cross-sectional view of the magnet shown in FIG. 7 and showing the magnetic flux distribution when a flux shorting washer is placed on top of the magnet, and FIG. 10 is a cross-sectional view of the magnet and its lines of force when the magnet is levitated by a levitating ring.

While the invention has been described in connection with a preferred embodiment, it will be understood that the intention is not to be limited to the particular form of the invention which has been shown, but the intention is, on the contrary, to cover the various alternative and equivalent constructions included within the spirit and scope of the appended claims.

BEST MODE FOR CARRYING OUT THE INVENTION

Figure 1:
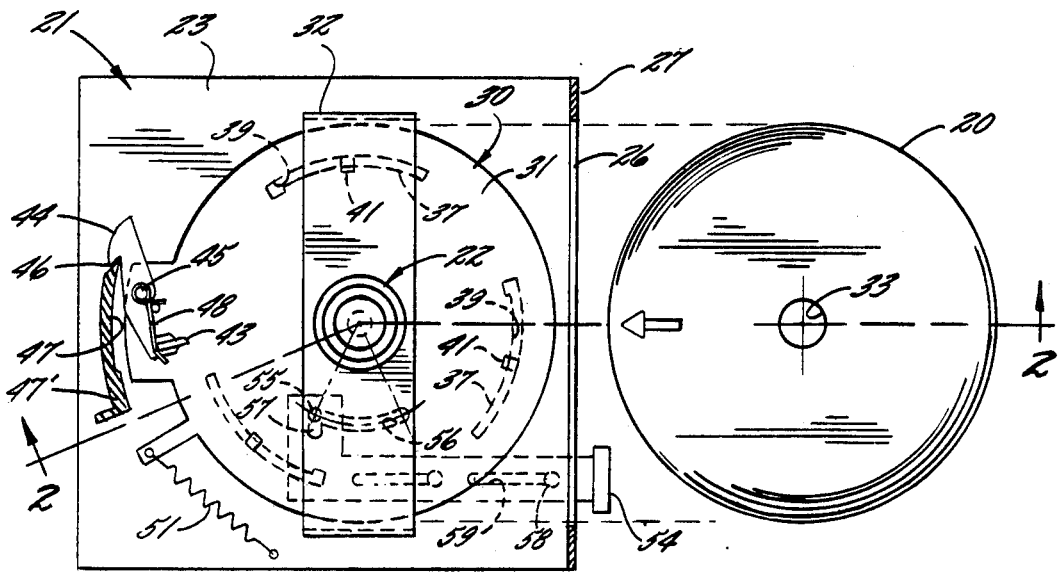
FIG. 1 is a plan view of a disc drive and a disc about to be inserted into the housing of the disc drive.
Figure 2:
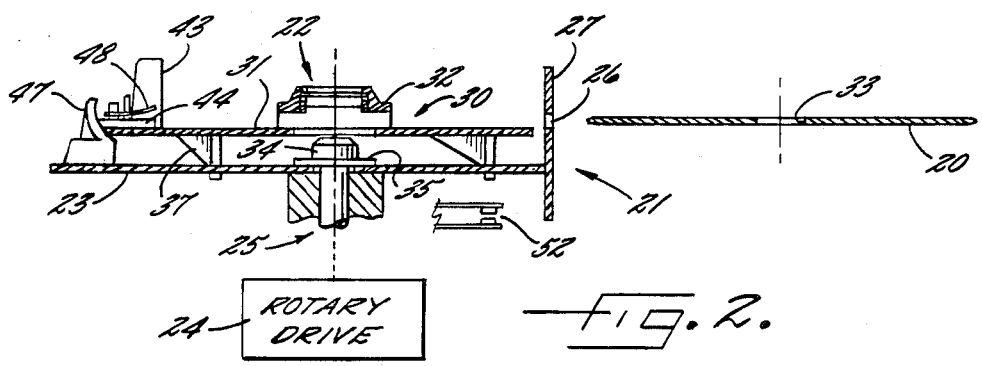
FIG. 2 is an elevation view of the disc drive and disc, in cross-section along line 2—2 in FIG. 1.
Figure 3:
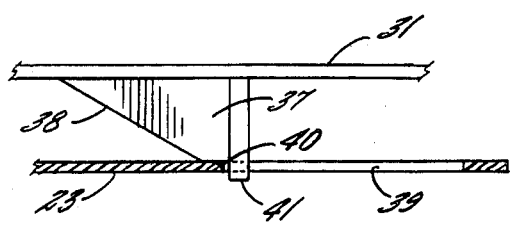
FIG. 3 is an elevation view of one of the three inclined legs on the housing of the disc player.

Turning now to the drawings, there is shown in FIGS. 1-2 a disc 20 and a disc player generally designated 21 which includes an embodiment generally designated 22 of the magnetic clamping device according to the invention. The disc player 21 has a frame 23 which is assumed to be fixed. The frame 23 provides support for a rotary drive 24 having a spindle 25 which engages with and rotates the disc 20.

In order for the disc 20 to engage the spindle 25, the disc 20 is inserted into the disc player 21 through a slit 26 in a front plate 27. The disc 20 slides into a housing generally designated 30 having a lower plate 31 and an upper part 32 bridgingly connected to the lower part 31. Although the lower plate 31 and the upper part 32 are generally parallel, it should be noted that the upper surface of the plate 31 and the lower surface of the upper part 32 are slightly concave with respect to the disc 20 when the disc 20 is inserted into the housing 30, so that the disc 20 is supported at its outer peripheral edge portions when it is slid into the housing 30. Because the disc 20 is always supported by its outer peripheral edge portions, its upper and lower central surfaces are not touched by the housing 30 and consequently these central surfaces are not marred or scratched when the disc 20 is inserted or ejected from the disc player 21.

The main function performed by the housing 30 is to hold the disc 20 and move the disc 20 axially with respect to the spindle 25 in order to engage and disengage the disc 20 with the spindle 25. The disc 20 is provided with a central hole 33 which engages with an axial centering hub 34 at the top of the spindle 25. After the disc 20 is mated with the centering hub 34, the disc rests on a disc driving plate 35 which is part of the spindle 25.

In order for the disc 20 to be inserted horizontally into the housing 20 and then for the disc 20 to be lowered with respect to the spindle 25 to engage with the centering hub 34, means are provided for axially moving the entire housing 30 with respect to the spindle 25 and frame 23. The housing 30 is provided with a set of legs 37 having a lower incline or ramp edge portion 38. Each leg 37 is received in an arcuate slot 39 in the frame 23, so that the leading edge 40 of each slot 39 abuts against the respective incline edge 38 of the corresponding leg 37. Thus the the legs 37 and arcuate slots 39 cooperate in a helical screw fashion so that the housing 30 moves vertically relative to the frame 23 when the housing 30 is rotated about the spindle 25 axis. The end of upward travel is defined by a toe 41 at the bottom of each leg 37. Each toe 41 abuts against the lower surface of the frame plate 23.

When the disc 20 is fully inserted into the housing 30, the outer peripheral edge of the disc 20 abuts against a rib 43 attached to a pawl 44. The pawl 44 is journalled to a vertical pin 45 secured to and rising above the lower part of the housing 31. The pawl 44 also has a notch 46 which engages with an edge of a catch 47 to lock the housing 30 in an upward resting position during the insertion of the disc 20. To insure that the catch 47 engages with the notch 46 of the pawl 44, a hair spring 48 is wound around the pin 45 and has one end acting against the rib 43. Its other end acts upon a second vertical pin 49 attached to and rising above the lower part of the housing 31. This second pin 49 also defines a stop position for the pawl 44.

When the disc 20 is fully inserted, its outer peripheral edge abuts against the rib 43 thereby releasing the pawl 44 from the catch 47. A return spring 51 is provided to rotate the housing 30 counterclockwise with respect to the frame 23 when the pawl 44 is disengaged from the catch 47. As the housing 30 rotates, the inclined surfaces 38 of the legs 37 are effective to lower the housing 30 vertically with respect to the frame 23 so that the disc 20 engages with the spindle 25. The catch 47 is further provided with an inwardly protruding surface 47' which acts against the pawl 44 to retract the rib 43 from the periphery of the disc 20 when the housing 30 rotates counterclockwise towards its clamping position. Thus the rib 43 will not prevent free rotation of the disc when the disc is engaged with the spindle 25.

At the extreme lower clamping position of the housing 30, the toe 41 of one of the legs 37 closes a switch 52 supplying electrical power to a motor in the rotary drive 24. Also, when this lower clamping position of the housing is reached, the magnetic clamping device 22 clamps the disc 20 to the disc driving plate 35.

To eject the disc 20 from the disc drive 21, a manually operated push-button slide 54 is pushed into the housing and engages with a third vertical pin 55 secured to and depending from the lower part 31 of the housing 30. An arcuate slot 56 is provided in the frame plate 23 through which the third vertical pin 55 depends in order for the pin 55 to engage with a transverse slot 57 in the eject slide 54. Vertical posts 58 depend from the frame plate 23 and engage with longitudinal slots 59 in the eject slide 54 to define the path of the eject slide 54. When the eject slide 54 is pushed into the disc player 21, the housing 30 is rotated clockwise with respect to the frame 23 so that the pawl 44 will engage with the catch 47 and the rib 43 will eject the disc 20 after the housing 30 has been rotated to its upper resting position.

Figure 4:
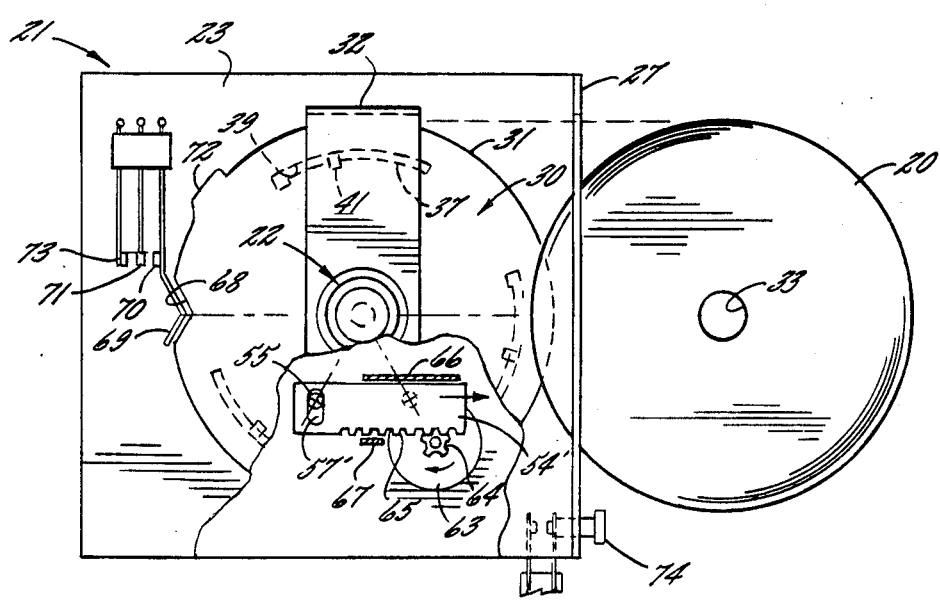
FIG. 4 is a plan view of an alternative embodiment of the disc player using an electric motor for raising and lowering the housing.

An alternative embodiment of the disc player is shown in FIG. 4. Instead of using mechanical components such as the pawl 44, catch 47, return spring 51 and eject slide 54 for raising and lowering the housing 30 with respect to the frame 23, an electric slide motor 63 having a pinion 64 engages a rack 65 on a slide 54' used in place of the eject slide 54. The slide 54' similarly has a transverse slot 57' engaging the third depending vertical pin 55. Longitudinal guides 66 and 67 define the path of the slide 54'.

In order to generate electrical signals to control the slide motor 63, the lower plate 31 of the housing has an indentation 68 receiving a switch lever 69. The switch lever 69 has a contact 70 which engages a second contact 71 when the disc 20 is fully inserted into the housing 30. Closure of contacts 70 and 71 drives the slide motor 63 clockwise thereby moving the slide 54' to the right and rotating the housing 30 counterclockwise. When the housing 30 has been rotated fully counterclockwise to the lower clamping position, a protrusion 72 on the lower plate 31 of the housing further drives the switch lever 69 outward so that an extreme contact 73 closes with the second contact 71. This final contact closure stops the slide motor 63. Similarly, when the disc 20 is in its clamping position the user may activate an eject push-button switch 74 to drive the motor 63 counterclockwise, thereby rotating the housing 30 clockwise until contacts 71 and 70 open. It is evident that the slide motor 63 may be controlled by a pair of set-reset flip-flops, one flip-flop for driving the motor forward and the other flip-flop for driving the motor backwards. The flip-flop to drive the motor forward or clockwise is set by closure of contacts 70 and 71 and is reset by closure of contacts 71 and 73. The flip-flop to drive the motor 63 backwards or counterclockwise is set by closure of the eject push-button switch 41 and reset by the opening of contacts 70 and 71.

Further detail and alternative embodiments for the components of the disc player 21 which raise and lower the disc 20 for engagement with the spindle 25 are discussed in U.S. Pat. No. 4,513,409, issued Apr. 23, 1985, of Marcel Staar entitled Loading And Unloading Mechanism For Slot-Type Disc Player Apparatus, herein incorporated by reference.

Turning now to FIG. 5, there is shown a detailed cross-sectional view of a magnetic clamping device 22 according to a preferred embodiment of the invention. The magnetic clamping device 22 is levitated to a resting position when the housing 30 is in its upper position with respect to the frame 23 and spindle 25. The magnetic clamping device 22 comprises an annular permanent magnet 76 which has a flux shorting washer 77 on its top side. The magnetic flux F from the magnet 76 interacts with a levitating ring 78 concentric with the magnet 76 and secured to the upper part 32 of the housing 30. Preferably the levitating ring 78 is mounted flush with the lower surface of the upper part 32 of the housing 30. The levitating ring 78 is made of magnetically permeable, ferromagnetic material such as soft iron so that the magnetic flux F is linked between the permanent magnet 76 and the levitating ring 78. Moreover, the dimensions of the levitating ring 78 and the magnet 76 are chosen as shown in FIG. 5 so that the magnet 76 is levitated against the force of its own weight when the housing 30 is in its upper position with respect to the spindle 25.

When the disc 20 is fully inserted into the housing 30, the housing 30 is lowered with respect to the spindle 25 by the action of a vertical translation drive 79 comprising, for example, the mechanical components such as the legs 37, the slide 54' and the motor 63 shown in FIGS. 1–4. The centering hub 34 engages with the hole 33 in the disc 20, as shown in FIG. 6. For the purpose of clamping the disc 20 to the spindle 25, the disc drive plate 35 is made of magnetically permeable material such as soft iron which interacts with the magnetic flux F from the magnet 76. As the housing 30 is lowered with respect to the spindle 25, the magnetic flux F links with the disc driving plate 35 so that the magnet 76 becomes attracted to the disc driving plate 35 instead of being levitated by the levitating ring 78. The flux F quickly changes direction and switches from being linked with the levitating ring 78 to being linked with the disc driving plate 35 so that the magnet 76 moves toward the disc driving plate 35 and clampingly secures the disc 20 which becomes sandwiched between the magnet 76 and the disc driving plate 35.

The spatial distribution of the magnetic flux F for the magnet 76 is more clearly shown FIGS. 7–10. The magnet 76, isolated in free space, initially has a flux distribution F as shown in FIG. 7. The magnet 76 is of the annular type having multiple pairs of north N and south S magnetic poles disposed about its circumference. The magnet 76 preferably has a thickness dimension t of 4 to 5 millimeters, an internal diameter $D_i$ of 15 millimeters and an outer diameter $D_o$ of 28 millimeters. A cross-section of the magnet 76 is shown in FIG. 8, illustrating the fact that a majority of the magnetic flux F bridgingly links the opposite magnetic poles N, S on the top and bottom of the magnet.

As shown in FIG. 9, the addition of a flux shorting washer 77 on the top of the magnet 76 provides containment of the magnetic flux emitted upward from the magnet 76. Thus, the magnetic flux F permeating free space is emitted primarily from the north and south poles on the bottom of the magnet.

The flux distribution in FIG. 9 permits the magnet 76 and shorting washer 77 to be levitated against the force of their own weight by magnetic interaction with the levitating ring 78. With the geometry shown in FIG. 10, the magnetic flux F emitted from the base of the magnet 76 becomes linked through the levitating ring 78. It is well known that in any magnetic circuit or system comprising permanent magnets, magnetically permeable material, and air gaps, the system tends to assume a configuration wherein the total potential energy is a minimum. This potential energy, for example, is the sum of the gravitational potential $g \int h \, dm$, plus the magnetic potential energy $\frac{1}{2} \int \vec{B} \cdot \vec{H} \, dv$, where g is the acceleration due to gravity, dm is the differential mass element, h is height, $\vec{B}$ is the magnetic flux density, $\vec{H}$ is the magnetic field intensity, and dv is the differential volume element. In practice these precise equations can be simplified assuming that the most significant change in total energy is due to the magnetic field energy $$\frac{1}{2\mu_o} \int |\vec{B}|^2 dv$$

($\mu_o$ being the magnetic permeability of free space) in the air gaps of the magnetic circuit. In general, the components in the magnetic circuit will move to the geometric position wherein there is a minimum amount of magnetic flux existing in the air gaps between the magnet 76 and the levitating ring 78 or, in the case of FIG. 6, the disc driving plate 35. This assumes, of course, that the housing 30, the disc 20, and the centering hub 34 are made of non-magnetic materials such as plastic and aluminum. Another viewpoint for analysis is that magnetic forces arise which are proportional to the change in magnetic potential energy with respect to changes in position of the magnetic components. Equilibrium requires a balance between the gravitational and magnetic forces. The magnitude of the magnetic force acting to urge the magnet 76 axially toward the disc driving plate 35, for example, is an inverse function of the distance of axial separation between the magnet 76 and the spindle 25.

One can intuitively see that the magnet 76 with its flux shorting washer 77 assumes a levitated position with respect to the levitating ring 78 in FIG. 10 since then the volume integral of the square of the magnetic flux density existing in the air gap between the magnet 76 and levitating ring 78 is at a minimum. If the magnet 76 is raised with respect to the levitating ring 78, the distance of the air gap increases, thereby increasing the magnetic potential energy. Similarly, if the magnet 76 is lowered with respect to the levitating ring 78, the effective length of the air gap also increases since the distance between the inner periphery of the ring 78 and the bottom of the magnet 76, where the flux is emitted, increases. Not much else, however, can be determined for the magnetic circuit except by experimentation, which has resulted in the embodiment shown in FIGS. 5-10. Moreover, this geometry has the advantage that the magnetic flux F from the magnet 76 is linked with the levitating ring 78 during the insertion or ejection of the disc 20 while the magnetic flux F is linked with the disc driving plate 35 when the disc 20 is being played and the magnet 76 is in its clamping position. Because the magnetic flux switches, the disc driving plate 35 does not oppose the levitation of the magnet 76 by the levitating ring 78 when the disc drive is in its resting position, and conversely the levitating ring 78 does not interfere with the magnetic interaction between the magnet 76 and the disc driving plate 35 when the disc drive is in the playing position and the magnet 76 is in its clamping position. This fortuitous result of the preferred geometry insures that the magnet 76 quickly switches between its resting and clamping positions and also insures that the switching occurs only when the central hole 33 in the disc 20 is engaged with the centering hub 34 so that the magnet 76 cannot contact, scratch or mar the surfaces of the information-bearing portion of the disc 20.

It should also be noted that the magnet 76 is normally spinning in its clamping position while it is stationary in its resting position. Means are provided to precisely define the clamping position and resting or levitating position of the magnet 76 regardless of its rotary motion. The major components in FIGS. 5-10, such as the magnetic clamping device 22 and spindle 25 are radially symmetric with respect to the axis of the spindle. In particular the upper part of the housing 32 has an integral retainer portion 81 enclosing the magnetic clamping device 22. The retainer portion 81 has an upper lip 82 cooperating with the peripheral edge portion 83 of a cap 80 containing the magnet 76 and flux shorting washer 77 so as to precisely define the upper limit position of the levitated magnetic clamping device 22.

Although the magnetic clamping device 22 shown in FIGS. 5-10 is inherently simple and economical, it should be noted that it solves many problems that at first glance seem to require rather complicated mechanical or electrical control components. The magnetic clamping device 22 inherently moves with respect to the housing 30 between its resting and clamping positions without any mechanical means or connection between the magnetic clamping device 22 and housing 30 to effect that movement. The movement occurs at the proper instant during the engagement or disengagement of the centering hub 34 with the central hole 33 in the disc 20. The levitation of the magnetic clamping device 22, in particular, is particularly difficult to accomplish with mechanical or electrical means. Mechanical means, for example a spring, would have to be actuated at the required intermediate point in the engagement or disengagement cycle. Electrical means, for example an electromagnet, would have to remain energized when the clamping device is in its resting position. In contrast to mechanical or electrical means for operating the clamping device, the magnetic clamping device according to the invention does not require electronic or mechanical control components. Thus it is highly reliable and provides failsafe operation so that the critical surfaces of the disc are not scratched or otherwise damaged.

I claim:

1. In a disc drive wherein a disc is clamped to a spindle for rotation, said spindle including ferromagnetic material, a clamping mechanism comprising, in combination, a magnetic clamping element adjacent an end of said spindle, said clamping element and spindle being relatively movable in the direction of the axis of said spindle between a first position wherein said clamping element engages and clamps said disc to the spindle and a second position wherein said clamping element is axially spaced from said spindle to provide clearance for the disc to be freely moved between the clamping element and the spindle in a direction transverse to the spindle axis, said clamping element including ferromagnetic material, a source generating magnetic flux linking the ferromagnetic material in said clamping element and spindle and providing magnetic clamping force acting to urge said element axially toward said spindle when in said first position, and a member adjacent said clamping element including ferromagnetic material in a path of flux from said source linking the ferromagnetic material in said clampig element and member and providing magnetic levitating force acting to urge said clamping element axially away from said spindle to provide said clearance when said clamping element and spindle are in said second position.

2. The combination as claimed in claim 1 wherein said spindle and clamping element are aligned on the spindle axis and said member is comprised of a ring of ferromagnetic material concentric with said clamping element and linked by flux to said ferromagnetic material in said clamping element when the clamping element and spindle are in said second position so as to provide magnetic levitating force.

3. The combination as claimed in claim 1 wherein the magnetic force acting to urge said clamping element axially of said spindle changes direction as said clamping element and spindle move between said first and second positions.

4. The combination as claimed in claim 3 wherein the magnitude of said magnetic force acting to urge said clamping element axially of said spindle is an inverse function of the distance of axial separation between the clamping element and the spindle, the clamping element tending to move from its first clamping position to its second position when the spindle and clamping element move relatively away from each other, and the clamping element tending to move in the first clamping position when the spindle and clamping element move relatively close to each other.

5. In a disc drive wherein a disc is clamped to a spindle for rotation, said spindle including ferromagnetic material, a clamping mechanism comprising, in combination, a magnetic clamping element adjacent an end of said spindle, said clamping element and spindle being relatively movable in the direction of the one of said spindle between a first position wherein said clamping element engages and clamps said disc to the spindle and a second position wherein said clamping element is axially spaced from said spindle to provide clearance for the disc to be freely moved between the clamping element and the spindle in a direction transverse to the spindle axis, said clamping element including ferromagnetic material, a source generating magnetic flux linking the ferromagnetic material in said clamping element and spindle and providing magnetic clamping force urging said element axially toward said spindle when in said first position, and a member adjacent said clamping element including ferromagnetic material in a path of flux from said source linking the ferromagnetic material in said clamping element and member and providing magnetic levitating force urging said clamping element axially away from said spindle to provide said clearance when said clamping element and spindle are in said second position, said member being spaced from said clamping element so that said spindle, disc and clamping element are free to rotate without interference when in said first clamping position, said member having a clamping position relative to said clamping element substantially out of the path of said flux linking the ferromagnetic material in said clamping element and said spindle and providing said magnetic clamping force.

6. The combination as claimed in claim 5 wherein at least some of the ferromagnetic material in the clamping element is permanently magnetized and provides said source, and a substantial portion of the flux established by the permanent magnetization of the clamping element is linked with the ferromagnetic material of the member when the clamping element and spindle are in said second position, and a substantial portion of the flux is linked with the ferromagnetic material of the spindle when the clamping element and spindle are in said first clamping position, relative axial movement of the spindle and clamping element being operative to switch flux linkage between the ferromagnetic material of the spindle and the ferromagnetic material of the member and cause the clamping element to abruptly move between said first clamping position and said second spaced position in response to changes in the relative axial position of the spindle and the clamping element.

7. The combination as claimed in claim 6 wherein the member magnetically levitates the clamping element when the clamping element and spindle are in said second spaced position when the disc is generally horizontal and the spindle is below the transversely moved disc and the clamping element is above the transversely moved disc.

8. In a disc drive having a housing for accepting an inserted disc and a spindle adjacent one side of the inserted disc for engaging and rotating the fully-inserted disc, the disc having a central aperture for receiving an axial centering hub secured to the spindle, and the disc drive having a clamping element and means for axially moving the clamping element and spindle relatively in the direction of the axis of the spindle between engaged and disengaged positions, a self-actuating holding mechanism for said clamping element to maintain said clamping element spaced from said spindle in said disengaged position comprising, in combination, a magnet included in said clamping element, the spindle including ferromagnetic material so that the disc is clamped by magnetic force between the clamping element and the spindle when the spindle and centering hub are engaged with the disc, the clamping element being magnetically attracted toward and held in clamping position engaged with the disc, and magnetic means for axially moving the clamping element from its clamping position to a spaced disengaged position offset from the inserted disc when the spindle and clamping element are relatively moved from their enggaged position to their disengaged position and for maintaining the magnetic clamping element at said spaced position so long as the centering hub is disengaged from the inserted disc so that the disc is freely movable between the clamping element and said centering hub when the disc is inserted or ejected from the housing, wherein said magnetic means for axially moving is ineffective to hold the magnetic clamping element away from the spindle when they are moved relatively from their disengaged position to their fully engaged position.

9. The combination as claimed in claim 8 wherein the magnetic means for axially moving the clamping element comprises a member including ferromagnetic material mounted in the housing on the side of the inserted disc opposite the spindle, the housing including means to hold the disc to within a predefined range of axial positions defining a path for the disc insertion generally normal to the spindle axis, so that magnetic flux linking the magnet of said clamping element and the ferromagnetic material mounted in the housing holds the clamping element out of the insertion path of the disc when the hub and spindle are disengaged from the disc.

10. The combination as claimed in claim 8 wherein the magnetic means for axially moving the clamping element from its engaged position to its disengaged position is effective to levitate the clamping element magnetically against the force of gravity to its spaced position when the axis of said spindle is vertical and the clamping element is located above the spindle.

11. In combination:
a disc drive having a housing for accepting an inserted disc and a spindle adjacent a first side of the inserted disc for engaging and rotating the fully inserted disc, the housing having a first part facing the first side of the inserted disc and a second part facing the second side of the inserted disc for defining a disc insertion path generally normal to the spindle axis and for limiting axial movement of the inserted disc, the disc having a central hole for receiving an axial centering hub on the spindle when the disc is fully inserted into the housing, means for axially moving the disc relative to the spindle when the disc is fully inserted in order to engage and disengage the spindle centering hub with the disc, a ferromagnetic plate on the spindle having a surface normal to the spindle axis for contact with a central portion of the first spindle when fully engaged with the disc; and an axially disposed magnetic clamping element including a permanent magnet and having a clamping position engaged with the second surface of the inserted disc, the clamping being effected by magnetic clamping flux linked between the clamping element and the ferromagnetic plate on the spindle, and means for moving and holding the clamping element axially away from the inserted disc to a disengaged position out of the insertion path when the spindle and hub were disengaged so that the clamping element does not interfere with the insertion and ejection of the disc or scratch the second surface of the disc, wherein:

the means for moving and holding the clamping element out of the insertion path of the disc comprising means for magnetically moving the clamping element and holding it in the disengaged position whenever the centering hub is disengaged from the inserted disc, said means for moving and holding being ineffective to hold the clamping element in the disengaged position when the spindle and hub are fully engaged with the inserted disc, wherein said means for moving and holding comprise ferromagnetic material and wherein the magnetic force for the moving and holding is caused by magnetic holding flux established primarily by permanent magnetization.

12. The combination as claimed in claim 11 wherein the magnetic holding flux is established primarily by the permanent magnetization of the permanent magnet in the magnetic clamping element.

13. The combination as claimed in claim 12 wherein the means for moving and holding the magnetic clamping element comprise an annular ring of ferromagnetic material mounted to the second part of the housing.

14. The combination as claimed in claim 13 wherein the permanent magnet is annular and has multiple pairs of poles disposed about the circumference of the annulus, the central axis of the annulus being generally parallel to the spindle axis, and wherein the clamping element further comprises magnetically permeable material disposed on the face of the annulus away from the second surface of the inserted disc so that magnetic flux is linked through the magnetically permeable material on the face of the annulus and emitted from the magnetic clamping element towards the ferromagnetic plate of the spindle when the hub and spindle fully engage the inserted disc, and wherein the annular ring of ferromagnetic material has an inside diameter greater than the outer diameter of the annual magnet and the annular ring encircles the magnetic clamping element when the clamping element is in its clamping position, and wherein the annular ring is mounted approximately flush with the surface of the second part of the housing facing the second surface of the inserted disc, so that when the spindle and hub are engaged and disengaged from the inserted disc, flux emitted from the annular magnet is alternately switched to the ferromagnetic plate on the spindle and the ferromagnetic annular ring, respectively, so that the clamping element tends to abruptly move between its clamping position and its disengaged position in response to the engagement and disengagement of the spindle and hub.

* * * * *